United States Patent Office 3,280,936
Patented Oct. 25, 1966

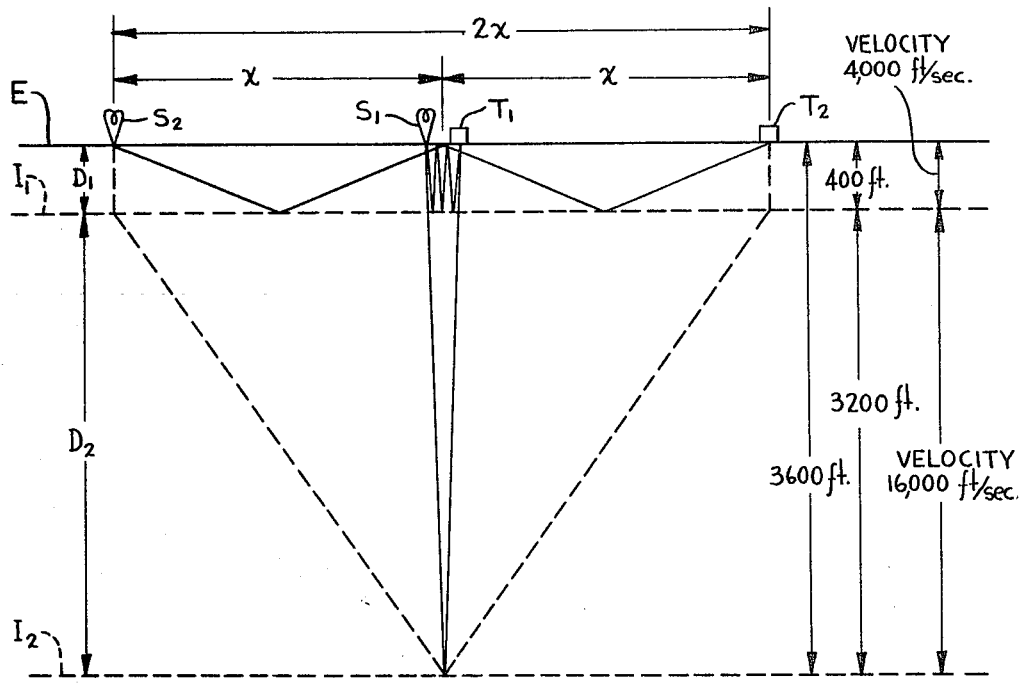
FOR $S_1$ TO $T_1$
　　VERT. TIME 3RD $I_1$ REFL. = 3 × .2 = .6 sec.
　　VERT. TIME 1ST $I_2$ REFL. = .6 sec.
FOR $S_2$ TO $T_2$
　　DIAG. TIME 2ND $I_1$ REFL. = .616 sec.
　　DIAG. TIME 1ST $I_2$ REFL. = .616 sec.
INVENTOR
WILLIAM H. MAYNE
BY Watson, Cole, Grindle & Watson
ATTORNEYS

3,280,936
METHOD FOR SEISMIC SURVEYING
William Harry Mayne, San Antonio, Tex., assignor to Petty Geophysical Engineering Company, a corporation of Delaware
Filed Mar. 7, 1961, Ser. No. 93,963
5 Claims. (Cl. 181—.5)

This invention relates to an improved method for conducting geophysical studies of the type wherein an artificial shock is imparted to the earth, and the seismic waves thereby propagated, are received after reflection from various strata interfaces, or subsurface beds, by a plurality of seismometers, the received seismic energy being suitably amplified, combined, and recorded. The principal object of the invention is the provision of a method whereby the energy reflected from a preselected subsurface bed may be emphasized, and the undesired energy reflected from the other subsurface beds may be reduced to a minimum in the final record.

This invention is an improvement of the method described in my U.S. Patent 2,732,906, issued January 31, 1956. In that patent, a method of surveying is disclosed in which provision is made for reducing the undesired or random energy in the final record. In the system disclosed in this patent, however, no provision is made for reducing the signals resulting from higher order reflections from one of the strata. As employed herein, the term "higher order reflections" refers to multiple reflections between a given strata and the earth's surface. For example, a second order reflection is one which travels from the earth's surface to the strata, is reflected to the earth's surface, is again reflected down to the strata and is reflected from the strata a second time to the earth's surface. It is a well-established fact that in reflection seismograph surveying, higher order reflections between a relatively shallow, good reflecting strata and the surface may interfere with or obscure the reflections from deeper strata. It is also well known that the polarity (or phase) of these higher order reflections will alternate with the order of the multiple of the reflection while the general form or character of the reflections remains unchanged. By this is meant that a second order reflection will have a polarity opposite to that of a third order reflection, but of the same polarity as a fourth order reflection.

Accordingly, it is an object of this invention to provide an improved method for seismic surveying.

It is another object of this invention to provide a method for seismic surveying which makes possible the production of a recording, augmenting the first order reflections and cancelling the higher order reflections.

It is a still further object of this invention to provide a method for seismic surveying in which successive orders of reflections above the primary, or first, order are combined in pairs to cancel each other, while the first order reflection signals are combined with each other of the same polarity and phase to reinforce each other and further simplify the process of distinguishing between the recorded signals.

It is a common practice by those skilled in geophysics to measure typical velocities in a given area by lowering a geophone into a drilled hole, shoot near the surface and thus determine the actual travel time to various interfaces. The velocities $V_1$ and $V_2$ to the first and second interfaces $I_1$ and $I_2$, respectively, represent experimentally determinable values. The depth $D_1$ of the first interface $I_1$ may, of course, vary from that at which the velocity determination was made. The velocities will generally be fairly constant over a region, however. Whenever multiple reflections are a problem, the primary reflection from the first, or $I_1$ interface will also be very strong and its vertical travel time will be directly determined from an arbitrarily selected shotpoint $S_1$ to a nearby similarly arbitrarily located transducer $T_1$ along with the other information. Consequently the depth $D_1$ can be easily determined. This depth can vary, of course, over a prospect, but a running check can be made as the survey progresses, and the distances modified to compensate for these changes. Determination of the depth $D_2$ of the second, or $I_2$ interface is somewhat less straight forward but no less rigorous.

From geological logs and the velocity survey previously mentioned, an interface (or change in formation) is chosen which would be most likely to yield a significant reflection. The existence of such a reflection can be confirmed by close study of the records and thus determine its approximate arrival. Even though the multiples possess a greater amplitude than the primary reflection from $I_2$, fragments of the $I_2$ reflection can usually be identified with a reasonable degree of certainty, yet will not be of mapping quality. Thus, again using the known velocities, one skilled in the art can reasonably postulate the depth of the $I_2$ interface, $D_2$. Given this information it is then a simple exercise in geometry to determine the required distances. The general formulae for this determination is as follows:

Let
$V_1$=Velocity from surface to $I_1$ interface
$V_2$=Velocity from $I_1$ interface to $I_2$ interface
$D_1$=Depth to $I_1$ interface
$D_2$=Distance between $I_1$ and $I_2$ interfaces
$X$=Horizontal distance from midpoint to $T_2$ or $S_2$, the transducer and shotpoint.

Hence, using shotpoint $S_1$ and receiving point $T_1$, the travel time for the $I_2$ reflection will be:

(1) $$2\left(\frac{D_1}{V_1}+\frac{D_2}{V_2}\right)$$

and the record time for the third order $I_1$ reflection will be:

(2) $$3\left(2\frac{D_1}{V_1}\right)$$

For interference to occur, then, these times will be equal, or:

(3) $$2\left(\frac{D_1}{V_1}+\frac{D_2}{V_2}\right)=3\left(2\frac{D_1}{V_1}\right)$$

or (4) $$\frac{D_2}{V_2}=2\frac{D_1}{V_1}$$

Then using $S_2$ and $T_2$ record time for $I_2$, reflection will be:

(5) $$2\left(\frac{D_1}{V_1}\right)+2\left(\frac{\sqrt{X^2+D_2^2}}{V_2}\right)$$

and record time for second order $I_1$ reflection will be:

(6) $$4\left(\frac{\sqrt{\left(\frac{X}{2}\right)^2+D_1^2}}{V_1}\right)$$

and these times must also be equal. Thus:

(7) $$2\left(\frac{D_1}{V_1}\right)+2\left(\frac{\sqrt{X^2+D_2^2}}{V_2}\right)=4\left(\frac{\sqrt{\left(\frac{X}{2}\right)^2+D_1^2}}{V_1}\right)$$

which simplifies to:

(8) $$D_1+\frac{V_1}{V_2}\sqrt{X^2+D_2^2}=\sqrt{X^2+4D_1^2}$$

in which $X$ is the only unknown in a specific case. This is a fourth order equation, and the most convenient solution will be a graphical one.

These and various other objects and features of the invention will be more clearly understood from a reading of the detailed description of the invention in conjunction with the drawing, in which:

The figure is a drawing in section showing a portion of the earth's surface and the locations of respective shot devices and transducers.

Referring now to the figure, there is depicted in section, a portion of the earth's crust in which "E" represents the earth's surface. $I_1$ represents a first substrata, and $I_2$ represents a second substrata. For the purpose of illustrating the principles of this invention, two shot producing devices $S_1$ and $S_2$ are employed and a pair of transducers $T_1$ and $T_2$ are positioned on the earth's surface at predetermined distances from each other. For example, the distance between the midpoint and the shot producing device $S_2$ may have been determined by the above method to be 990 feet; the distance between the midpoint and transducer $T_2$ will also be 990 feet.

Assume that it has been determined by the above method that the travel time to the first interface $I_1$ and the return to the earth's surface E is .20 second. For the essentially vertical path from shot location $S_1$ to the transducer $T_1$, the third order reflection between the surface and the interface $I_1$ would have a travel time of .60 second and would interfere with the primary reflection from the second interface $I_2$, it being experimentally determined that the travel time to the second interface and return to the surface E is also .60 second. By placing shot location $S_2$ and transducer $T_2$, 990 feet on opposite sides of $S_1$ and $T_1$, the second order reflection from interface $I_1$ would have a travel time of .616 second. The first order reflection from interface $I_2$ would likewise have a travel time of .616 second. Thus if the independent recordings made at $T_1$ and $T_2$ were combined, the signal received at $T_2$ would have to be advanced in time by .016 second to obtain coincidence between the $I_2$ reflections. Since this advance would also advance the second order reflection from $I_1$ by the same amount, this second order $I_1$ reflection would then coincide in time with the third order $I_1$ reflection recorded at $T_1$, but would be inverted in phase because of the difference in order. Thus the two interfering multiple reflections from $I_1$ would cancel each other while the two $I_2$ reflections being of the same order would reinforce each other. Although only two pairs of paths are shown, other pairs could be similarly chosen to obtain even better averaging conditions and the example illustrated is intended to be merely for the purpose of explaining the basic principle involved.

While only first, second, and third order reflections are shown, it is understood that numerous additional orders of reflections take place, and these have been illustrated only for the purpose of explanation. As will be subsequently explained, a number of transducers are connected to a recording cable and individual records made for each of the transducers. The independent recordings may then be combined in the manner suggested in my previously mentioned U.S. patent. The two interfering multiple reflections from subsurface strata $I_1$ will be of adjacent order, namely, second and third order, and will cancel each other when combined on a transfer magnetic tape since they will be of opposite phase. The reflections from $I_2$ will be combined on the transfer magnetic tape as signals which reinforce each other. It is to be noted that elimination of a particular multiple reflection will clarify a portion of the record at least equal to the vertical travel time of the $I_2$ reflection. In the specific example cited this will result in a time "window" of .2 second in the zone where arrival of the significant $I_2$ reflection is expected, so that minor variations in its actual arrival time will be unimportant. Mapping of the $I_2$ interface can thus proceed in orderly fashion with periodic adjustments in the distances as the trend of the depths change.

What is claimed is:
1. In a method of seismic surveying, the steps comprising observing the velocity of sound travel from the earth's surface to the first interface, observing the velocity of sound travel between the first and second interfaces, calculating the depth of the first interface, calculating the distance between the first and second interfaces, inserting these values in Equation 8 appearing in the specification, graphically plotting said equation to determine the various solutions of said equation, locating on the earth's surface a first shot producing device and a first transducer at equal distances on opposite sides of a predetermined midpoint, locating a second shot producing device and its companion second transducer at different equal distances on opposite sides of said midpoint in accordance with one of the solutions of said equation, firing the first shot producing device and recording the signal received by each of the transducers, firing the second shot producing device and recording the signal received at each of the transducers and algebraically re-recording the signals received at individual ones of the transducers whereby second and higher order signal reflections are cancelled.

2. In a method of seismic surveying according to claim 1, further comprising the steps of moving said shot producing devices and said transducers a predetermined equal distance on a straight line along the earth's surface to a new position and repeating each of the steps set forth in claim 1.

3. A method of seismic surveying comprising the steps of graphically plotting Equation 8 appearing in the specification to determine the various solutions of said equation, locating on the earth's surface a first shot producing device and a first transducer at equal distances on opposite sides of a predetermined midpoint, locating a second shot producing device and a second transducer on opposite sides of said midpoint, said last mentioned distances being equal to one of the solutions of said equation, firing the first shot producing device and recording the signal received by each of said transducers, firing the second shot producing device and recording the signal received at each of the transducers and algebraically re-recording the signals received at individual ones of the transducers whereby second and higher order signal reflections are cancelled.

4. The method of seismic surveying according to claim 3 further comprising the steps of spacing transducers and shot producing devices at equal distances on opposite sides of a said predetermined midpoint which last mentioned distances are individually equal to respective ones of the solutions of said equation and repeating the steps of firing the shot producing devices, recording the signal received by respective ones of the transducers and re-recording the signals received at individual ones of the transducers in a manner to cancel signals of opposite phase whereby second and higher order recorded signal reflections are cancelled.

5. In a method of seismic surveying, the steps of experimentally determining velocities of sound travel from the earth's surface to each of two interfaces $D_1$ and $D_2$ having depths in that order to compute the depth to the interfaces from observed travel time, using these results to determine the placement of the first shot and its companion transducer in locations on the earth surface at equal horizontal distances on opposite sides of a predetermined midpoint, and similarly locating placement of a second shot and its companion transducer located at equal but different horizontal distances on opposite sides of said midpoint said second distance being selected to satisfy Equation 8, appearing in the specification, firing the first shot producing device and recording the signal received at the first transducer, firing the second shot producing device and recording a signal received at the second transducer with signals which may be algebraically combined, whereby a higher order signal reflection from the interface at depth $D_1$ recorded from the first shot will be retained by the next lower order of signal reflection from the same interface recorded from the second shot whenever the signal reflections from an interface at depth $D_2$ recorded from the two shots are adjusted for time coincidence.

References Cited by the Examiner

UNITED STATES PATENTS

| | | | | |
|---|---|---|---|---|
| 1,799,398 | 4/1931 | Taylor | 181— | .5 |
| 2,148,422 | 2/1939 | Blau | 181— | .5 |
| 2,203,272 | 6/1940 | Sparks | 181— | .5 |
| 2,231,575 | 2/1941 | Gardner | 181— | .5 |
| 2,260,217 | 10/1941 | Eckhardt et al. | 181— | .5 |
| 2,336,053 | 12/1943 | Athy et al. | 181— | .5 |
| 2,623,113 | 12/1952 | Baylie et al. | 181— | .5 |
| 2,849,076 | 8/1958 | Kaufman | 181— | .5 |
| 2,906,363 | 9/1959 | Clay | 181— | .5 |
| 2,970,876 | 2/1961 | Moody | 181— | .5 |
| 2,993,555 | 7/1961 | Wolf | 181— | .5 |
| 3,016,970 | 1/1962 | Allyn et al. | 181— | .5 |
| 3,040,833 | 6/1962 | Mendenhall et al. | 181— | .5 |
| 3,105,568 | 10/1963 | Jolly | 181— | .5 |

BENJAMIN A. BORCHELT, *Primary Examiner.*

CHARLES W. ROBINSON, CHESTER L. JUSTUS, SAMUEL FEINBERG, *Examiners.*

A. S. ALPERT, J. W. MILLS, M. F. HUBLER,
*Assistant Examiners.*